Figure 2:
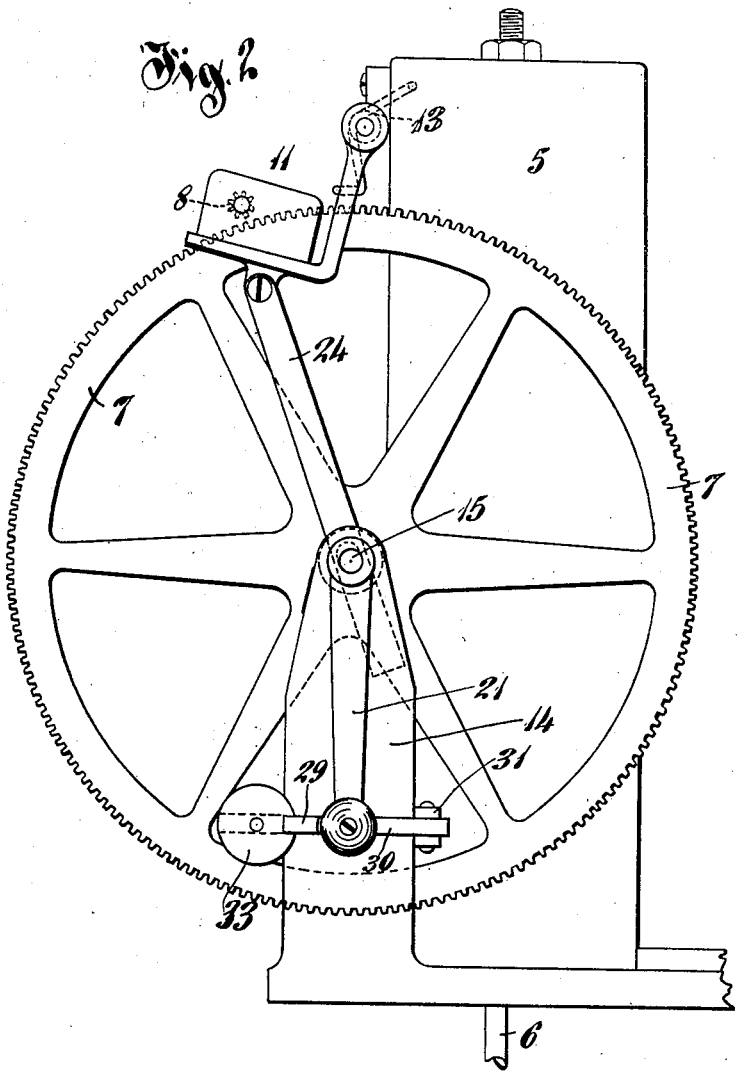

W. B. MOON.
TOTAL ADDING WEIGHING SCALE.
APPLICATION FILED OCT. 21, 1909.
972,394.
Patented Oct. 11, 1910.
2 SHEETS—SHEET 1.
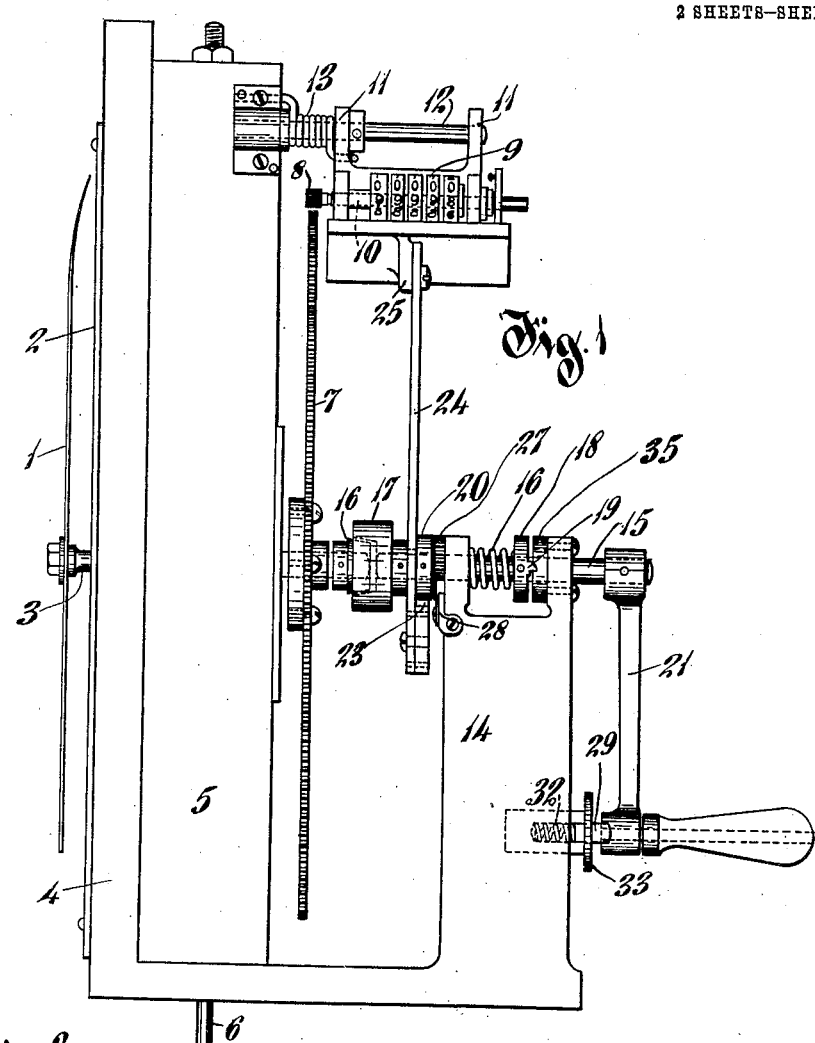
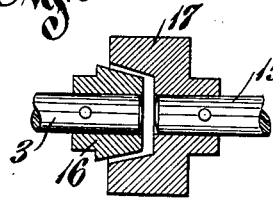
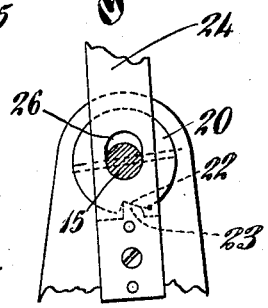
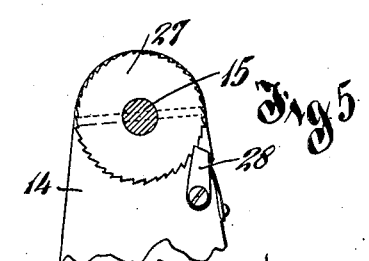
Witnesses
Earl W. Griffin
Charles W. Hoffman
Inventor
William B. Moon
by Alfred M. Allen
Atty

W. B. MOON.
TOTAL ADDING WEIGHING SCALE.
APPLICATION FILED OCT. 21, 1909.

972,394.

Patented Oct. 11, 1910.
2 SHEETS—SHEET 2.

Witnesses
Earl W. Suffrin
Charles W. Hoffman

Inventor
William B. Moon
by Alfred M. Allen
Atty

UNITED STATES PATENT OFFICE.

WILLIAM B. MOON, OF DAYTON, OHIO.

TOTAL-ADDING WEIGHING-SCALE.

972,394.

Specification of Letters Patent.

Patented Oct. 11, 1910.

Application filed October 21, 1909. Serial No. 523,927.

*To all whom it may concern:*

Be it known that I, WILLIAM B. MOON, a citizen of the United States, residing in Dayton, in the county of Montgomery and State of Ohio, have invented certain new and useful Improvements in Total-Adding Weighing-Scales, of which the following is a full, clear, and exact description, reference being had to the accompanying drawings, forming part of this specification.

My invention relates to weighing scales, in which the weights are indicated by the movement of a pointer over a graduated dial, and the object of the invention is to provide an attachment to be applied to such dial weighing scales, whereby the various separate loads of such particular commodities as desired, or all the various loads weighed on the machine may be severally registered on suitable counting wheels, and the totals of these amounts added up so that it may be at once determined the total amount of the particular commodities that have been weighed in any desired interval of time.

My invention consists of that novel construction and arrangement of parts, to be hereinafter particularly pointed out and claimed.

In the drawings Figure 1 is a side elevation illustrating my improvements. Fig. 2 is a rear elevation of same. Fig. 3 is a detail longitudinal section of the friction clutch for connecting the auxiliary shaft for actuating the total adding devices with the main shaft of the dial indicator. Fig. 4 is a detail cross section of the auxiliary shaft showing the connection therewith of the counter engaging pitman. Fig. 5 is a detail view of the ratchet and pawl which prevents any back movement of the auxiliary shaft.

1 is the pointer and 2 the dial plate of the weighing machine, the dial being graduated for any weights within the capacity of the machine, and the pointer is mounted on the main shaft 3, having suitable bearings in the frame 4 and casing 5.

I have not illustrated the mechanism of the weighing scales either in the platform construction or the pointer actuating construction, as these features of the scale form no part of my present invention, and any of the well known constructions of weighing scales may be employed.

6 is the rod which connects the indicating and other mechanism within the case 5 with the platform mechanism.

In applying my invention to the weighing scales, I extend the main shaft 3 which rotates the pointer out through a suitable bearing in the rear of the case, and on this shaft is securely mounted to rotate therewith the gear 7. This gear 7 is provided with the proper number of teeth so that the movement of the gear will correspond with the movement of the pointer 1 over the dial, and when it is desired to register the movements of the gear for adding up the amounts weighed as indicated by the pointer, the pinion 8 of the counting mechanism is brought into engagement with this gear, as will be hereinafter described.

Any of the well known constructions of total adding counting wheels may be provided, and I have illustrated a series of five of such counting wheels 9, mounted on the shaft 10 suitably journaled in a casing 11, the shaft 10 carrying the pinion 8, so that the rotation of the pinion will actuate the counters in the well known way to register the movement of the gear wheel 7.

The counting mechanism and its casing is suspended by its frame 11, pivotally mounted on the pin or stud 12, secured to the casing 5, above the gear wheel 7. 13 is a coiled spring mounted on the stud 12 between the frame and the casing, one end of the spring being secured to the casing, and the other end bearing on the frame and tending to hold the frame and counter mechanism, with the pinion 8 disconnected from the gear 7. I have not shown the particular construction of counting mechanism, because any of the well known devices for this purpose may be employed, but it will be understood that the proper number of counting wheels, gears, pawls and shafts are employed to register any desired number of turns of the pinion 8, and also with suitable re-setting devices to re-set the counters to zero when desired.

Mounted in suitable bearings in the standard 14 attached to the main frame of the machine, is an auxiliary shaft 15 in alinement with the main shaft 3 of the dial mechanism. The outer rear end of the shaft 3 has securely pinned thereto the male clutch member 16 and the inner end of the shaft 15 has securely pinned thereto the female clutch member 17. These clutch members are normally out of contact, the shaft 15 having an endwise movement in its bearings in the standard 14, and a coiled spring 16 mounted on the shaft 15 and bearing between the standard and the disk 18, pinned to the shaft 15, holding the clutch members apart. The disk 18 carries a cam lug 19 which, when the parts are at rest, engages a recess in the retaining disk 35 which is loosely mounted on the auxiliary shaft, and securely pinned to the standard.

21 is the operating handle for the auxiliary shaft 15, and as soon as this shaft is rotated by the handle 21 the cam lug 19 rides out of the recess in the retaining disk, and over the face of the disk, and inasmuch as the clutch engaging disk 18 is keyed to the shaft 15, as soon as the operating handle is turned the shaft will be shifted inwardly to cause the friction clutch members 16 and 17 to engage and thereupon the auxiliary shaft 15 will be coupled to the dial shaft 3.

Mounted on the shaft 15 and pinned thereto, is the cam disk 20 formed with a cam groove 22 which engages the lug 23 on the lower end of the counter connecting pitman 24. The upper end of this pitman is pivotally connected to a depending lug 25 on the counter casing, and the lower end of the pitman is provided with an oblong slot 26 through which the auxiliary shaft 15 passes. It will be evident from this that as the shaft 15 is rotated the lug 23 will ride out of the recess 22, in the cam disk 20, drawing downwardly the pitman 24, and with it the counting mechanism, so that the pinion 8 will be brought into engagement with the gear 7.

27 is a ratchet wheel pinned to the shaft 15, and engaged by the spring pressed pawl 28 pivoted on the standard by means of which any back movement of the shaft 15 is prevented.

Normally the operating handle 21 is held against a stop latch 29 which is carried by the arm 30, pivoted in the lugs 31 on the standards. The latch 29 is normally held in the pathway of the operating handle by the coiled spring 32 seated in a recess in the standard, and bearing upon the under surface of the latch, and 33 is a disk carried by the latch 29 in a convenient position to be depressed by the hand of the operator when grasping the handle to release the latch. The operation of the device will be sufficiently evident from the foregoing description.

As I have heretofore stated, the ordinary mechanism for indicating the amount of the load on the scales is contained in the case 5, and by this mechanism the pointer will be moved to the proper position on the dial, and as soon as the load is removed from the platform, the pointer will be automatically returned to zero, and stopped at the zero point in the usual way for such indicating scales. Inasmuch, however, as the gear 7 is secured on the pointer shaft, this gear will also be rotated with each movement of the pointer.

Should the user, however, desire to know how many pounds may have been weighed on this scales during any given interval, or should he desire to keep a record of the amount of any particular commodity that may be weighed, he then makes use of the total adding attachment. The scales will then be used for all other commodities in the usual way, the pointer being automatically returned to zero, and no registration being made except for the particular article desired. For example, a grocer may desire to keep a statement of the amount of sugar sold, and in that event he would operate the total adding mechanism only when sugar was weighed on the scales, and the scales could be used for other articles without any list being kept. In order to keep this list of all commodities, or any particular commodity that may be weighed, before the load is removed from the scales, the operator grasps the handle 21, releases the latch 29 by depressing same, and rotates the shaft 15. This movement rotates the disk 18, brings the lug 19 out of the recess and against the face of the disk 35. The friction clutch 16, 17, is actuated and the pointer returned to zero, where it is stopped by the usual stop. The friction clutch is not sufficiently powerful to prevent the further rotation of the shaft 15 by the handle 21, after the pointer and the main shaft 3 have been stopped, and the operator, therefore, completes the revolution of the operating handle, the handle being stopped at its normal position by the latch 29.

In addition to coupling up the main shaft 3, the rotation of the auxiliary shaft 15 rotates the cam disk 20 which, in turn, draws upon the pitman 24, bringing the pinion 8 into mesh with the gear 7, so that the movement of the gear is recorded on the counting wheels. The moment, however, the shaft 3 and the pointer 1 are stopped, upon the pointer being returned to zero, the gear 7 is also stopped so that only the amount weighed is recorded on the counting wheels. As the operating handle 21 is returned to its normal position, the lug 23 on the pitman enters the recess 22, in the disk 20, and the coiled spring 13 draws the pitman to the lower end of the slot 26 and disconnects the pinion 8 of the counting mechanism from the gear 7. In this way the total amount weighed by the scales of any desired loads is accurately indicated.

Having thus described my invention what I claim as new and desire to secure by Letters Patent, is:

1. In a device of the character specified, the combination with the weight indicating mechanism, of a supplemental resetting mechanism normally inactive, means for coupling the supplemental re-setting mechanism to the weight indicating mechanism when desired, a counting device and mechanism for actuating same, and means for connecting the counter actuating means with the weight indicating mechanism for indicating the amounts weighed when using the supplemental resetting mechanism.

2. In a device of the character specified, the combination with the pointer actuating mechanism, of a supplemental shaft normally inactive, means for coupling said shaft to the pointer actuating mechanism to reset the pointer to zero, when desired, a counting device with mechanism for actuating same, means for connecting the counter actuating mechanism with the pointer actuating means, for indicating the return movement of the pointer.

3. In a device of the character specified, the combination with a shaft carrying a pointer, of a supplemental shaft normally inactive, with means for coupling the two shafts to reset the pointer shaft to zero, a counting device with mechanism for actuating same, and means for connecting the counter actuating means with the pointer shaft, to indicate the movement thereof.

4. In a device of the character specified, the combination with a shaft carrying a pointer, of a supplemental shaft normally inactive, with means for coupling the two shafts to reset the pointer to zero when desired, a counting device with a pinion for actuating same, and a gear secured on the pointer shaft normally out of engagement with the counter pinion, and means for bringing said gear and pinion into engagement with the coupling together of the pointer and supplemental shaft.

5. In a device of the character specified, the combination with a shaft carrying a pointer, of a supplemental shaft normally inactive, with means for coupling the two shafts to reset the pointer to zero when desired, a counting device with a pinion for actuating same, and a gear secured on the pointer shaft normally out of engagement with the counter pinion, a pitman intermediate the counting mechanism and the supplemental shaft, with a cam to engage the pitman and to force the counter pinion into engagement with the gear.

WILLIAM B. MOON.

Witnesses:
MONICA STATTELMANN,
G. R. STATTELMANN.